Aug. 2, 1938.  D. V. SINNINGER  2,125,468
RADIO TUNING INDICATOR
Filed June 17, 1937
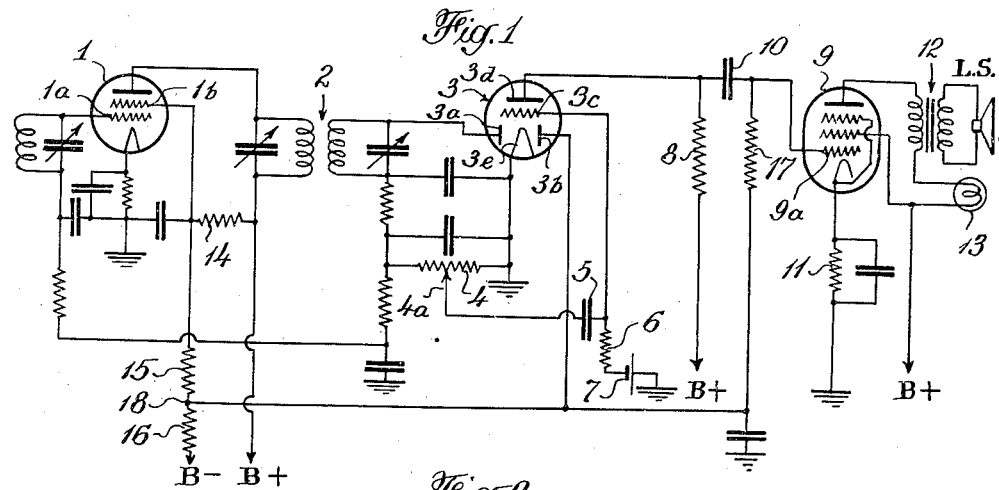
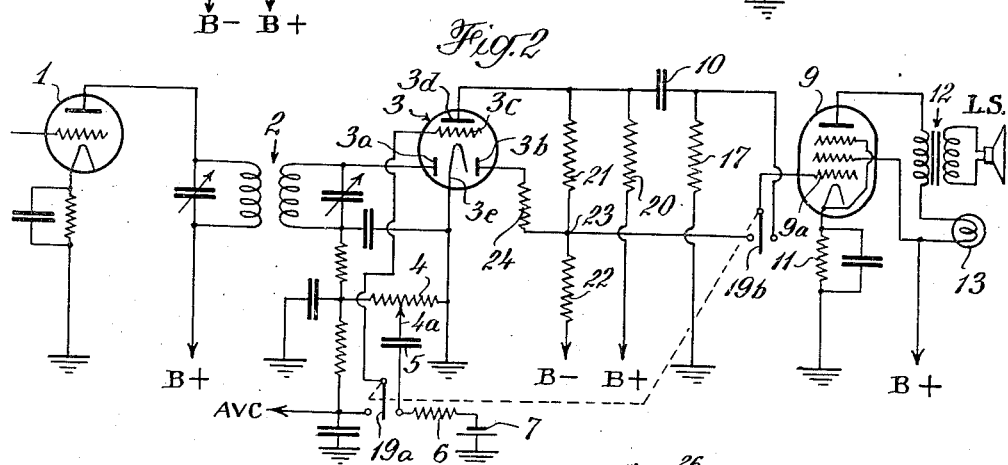
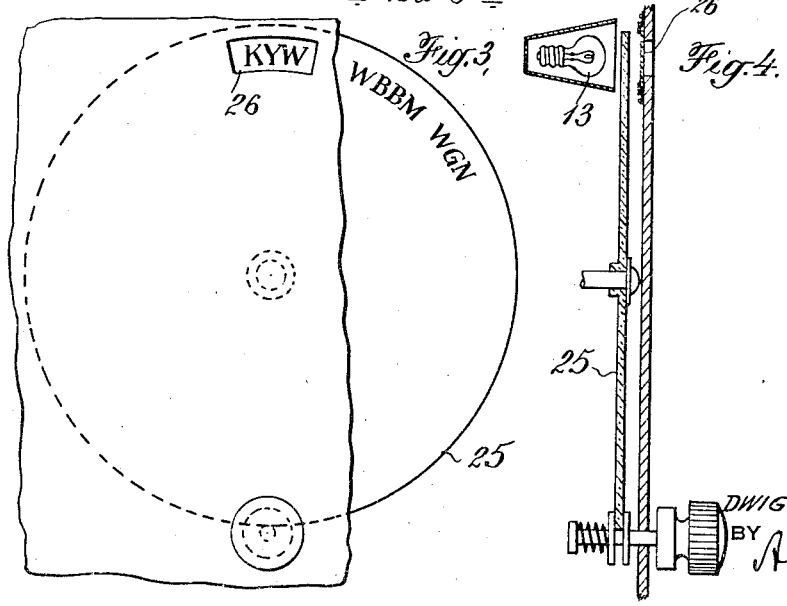
INVENTOR
DWIGHT V. SINNINGER
BY Albert C. Bell
ATTORNEY Patented Aug. 2, 1938

2,125,468

UNITED STATES PATENT OFFICE 2,125,468

RADIO TUNING INDICATOR

Dwight V. Sinninger, Chicago, Ill., assignor to Johnson Laboratories, Inc., Chicago, Ill., a corporation of Illinois Application June 17, 1937, Serial No. 148,669

5 Claims. (Cl. 250—20)

This invention relates to radio receiving systems and more particularly to means for indicating the condition of resonance of such systems at the frequency of a desired incoming signal.

Although resonance indicators may be advantageously applied to any type of radio receiver, they are especially useful in receivers having means for automatically regulating the high-frequency amplification in accordance with the strength of the incoming signal. It is difficult to tune such receivers correctly to resonance with a desired signal by ear, since the audible output of the receiver remains substantially unchanged as the station selector is varied slightly to either side of the setting corresponding to exact resonance with the carrier frequency of the desired signal.

In the past, various types of indicators have been employed to indicate resonance. An early form consisted of an ordinary pointer-type milliammeter, so connected in the circuits of the receiver that resonance was indicated by a minimum deflection of the pointer. A later form utilized a shadow upon a translucent screen which changed in width to indicate approach to exact tuning, resonance usually being realized when the shadow was narrowest. In still another arrangement, resonance was indicated by the change in brilliance of a light source, the source becoming increasingly dim as exact resonance was approached.

It is an object of the present invention to provide a resonance indicator in which the condition of correct tuning is indicated by the peak brilliance of a light source.

An additional object is to provide a resonance indicator which may readily be attached to a radio receiver employing automatic amplification control without requiring elaborate and complicated changes in the circuit arrangements of the receiver.

Still another object of the invention is to provide means for insuring accurate and silent tuning of a radio receiver to receive any desired signal within its tuning range.

The invention will be better understood by reference to the accompanying drawing, in which:

Fig. 1 is a schematic wiring diagram of a portion of a radio receiver incorporating the arrangements of the invention;

Fig. 2 is a modification of the circuits shown in Fig. 1, in which certain of the vacuum tubes of the receiver function alternately as a portion of the resonance-indicating arrangements;

Fig. 3 shows a form of dial suitable for use on the receiver of Figs. 1 and 2; and Fig. 4 is a view of the dial of Fig. 3 taken at right angles to Fig. 3.

Referring to Fig. 1 of the drawing, high-frequency amplifying vacuum tube 1 is coupled by means of selective system 2 to demodulating vacuum tube 3. The direct-current output voltage of diode anode 3a of vacuum tube 3, which is developed across potentiometer 4, is applied to the grid 1a of vacuum tube 1, in the conventional arrangement for obtaining automatic amplification control. The audio-frequency output voltage of diode anode 3a of vacuum tube 3 is also developed across potentiometer 4, and a desired portion of this voltage is tapped off by means of movable arm 4a. This audio-frequency voltage is applied to triode grid 3c of vacuum tube 3 through capacitor 5. Grid 3c is provided with grid-leak 6 and biasing potential source 7. Triode plate 3d of vacuum tube 3 is connected to one terminal of load resistor 8, and to grid 9a of vacuum tube 9 by means of capacitor 10. The cathode circuit of vacuum tube 9 includes biasing resistor 11, and its plate circuit includes the primary winding of output transformer 12 and indicating device or bulb 13.

A network consisting of resistors 14, 15 and 16 in series is connected between a source of high positive potential and a source of potential which is negative with respect to ground, and screen-grid 1b of vacuum tube 1 is connected to the junction of resistors 14 and 15. Grid 9a of vacuum tube 9 is connected through grid-leak 17 to junction 18 of resistors 15 and 16, which junction is also connected to diode anode 3b of vacuum tube 3.

In operation, when no signal is present at the input of vacuum tube 1, no appreciable direct-current voltage is developed across potentiometer 4 and grid 1a of vacuum tube 1 is practically at ground potential. The potential drop across resistor 14 due to the screen-grid current of vacuum tube 1 under these conditions, therefore, is such that junction 18 is substantially negative with respect to ground. This in turn makes the plate current of vacuum tube 9 insufficient to light bulb 13. When a desired signal is tuned in, however, a direct-current voltage is developed across potentiometer 4 and is applied to grid 1a of vacuum tube 1, greatly lowering its screen-grid current and hence the potential drop across resistor 14. The potential of junction 18, therefore, becomes less negative with respect to ground and, if the incoming signal is strong enough, may become very slightly positive with respect to ground. If junction 18 becomes positive with respect to ground, however, diode anode 3b of vacuum tube 3, which is connected to it, draws current and produces a voltage drop across resistor 16 which effectually counteracts any tendency of junction 18 to become appreciably positive with respect to ground.

The above-mentioned decrease in negative potential on junction 18 causes the plate current of vacuum tube 9 to rise to a point at which it is sufficient to light bulb 13. The maximum plate current is limited in value by biasing resistor 11, which provides vacuum tube 9 with a bias voltage even when junction 18 is substantially at ground potential. For any given incoming signal, bulb 13 produces its maximum intensity when the direct-current voltage across potentiometer 4 is a maximum, and this condition in turn corresponds to exact resonance with the signal. Thus bulb 13 provides an accurate indication of correct tuning of the receiver.

Referring now to Fig. 2, high-frequency amplifying vacuum tube 1 is coupled by means of selective system 2 to demodulating vacuum tube 3 which, in addition to the demodulating diode anode 3a, contains a second diode anode 3b and the grid 3c and plate 3d of a triode, all employing common cathode 3e. By means of one portion 19a of gang switch 19, either the direct-current voltage or the audio-frequency voltage which is developed across potentiometer 4 may be applied to the triode grid 3c of vacuum tube 3. A network consisting of resistors 20, 21 and 22 in series is connected between a source of high positive potential and a source of potential which is negative with respect to ground, and the plate 3d of the triode portion of vacuum tube 3 is connected to the junction of resistors 20 and 21. Junction 23 of resistors 21 and 22 may be connected to the second diode anode 3b of vacuum tube 3 through resistor 24 in order to prevent junction 23 from becoming substantially more positive than ground potential. The grid 9a of vacuum tube 9 may be connected either to junction 23 or to the junction of capacitor 10 and grid-leak 17, which are serially connected between the triode plate 3d of vacuum tube 3 and ground, in accordance with the setting of the second portion 19b of gang switch 19. The plate circuit of vacuum tube 9 includes indicating device or bulb 13 and the primary winding of output transformer 12, and its cathode circuit includes biasing resistor 11.

In operation, with gang switch 19 thrown to the left, the triode portion of vacuum tube 3 amplifies the direct-current voltages which appear across potentiometer 4, and thus produces variations in the voltage drop across load resistor 20. When the direct-current voltage across potentiometer 4 is practically zero, the plate current of vacuum tube 3 produces a voltage drop across resistor 20 which is such that junction 23 is substantially negative with respect to ground. As the direct-current voltage across potentiometer 4 increases, the plate current of vacuum tube 3 and hence the voltage drop across resistor 20 decreases, so that junction 23 becomes less negative with respect to ground and, if the incoming signal is strong enough, may become very slightly positive with respect to ground. Junction 23 is prevented from becoming appreciably positive with respect to ground by diode anode 3b, which upon becoming slightly positive draws current and produces a counteracting potential drop across resistor 22. Series resistor 24 retards the operation of diode anode 3b so that it is not too abrupt.

The above-mentioned change of potential on junction 23 causes the plate current of vacuum tube 9 to change from practically zero in the case of no signal at the input of vacuum tube 1, to a sufficiently high value to light bulb 13 when a desired signal is tuned in. After the receiver is carefully tuned to provide maximum brilliance of bulb 13 for a given signal, gang switch 19 is thrown to the right. The triode portion of vacuum tube 3 and vacuum tube 9 then function as ordinary audio-frequency amplifiers to amplify the audio-frequency voltage variations which are present across potentiometer 4. A suitable grid-bias voltage is supplied to the triode grid of vacuum tube 3 by means of grid-leak 6 and C battery 7. Vacuum tube 9 is properly biased by the voltage drop across resistor 11 in its cathode circuit.

It will be understood that the direct-current voltage which is developed across potentiometer 4 may also be employed to automatically regulate the amplification of vacuum tube 1 and other vacuum tubes of the receiver by making suitable connections to the point marked AVC.

Since no signal voltages are applied to the output vacuum tube during the tuning operation in this modification, so-called "silent tuning" is achieved and the annoyance of hearing one undesired station after another as the tuning selector is being turned toward the desired station is eliminated. Furthermore, when the desired signal is finally heard, it is properly tuned in and the receiver requires no further adjustment to insure satisfactory reception.

Figs. 3 and 4 show a preferred arrangement of the indicating light 13 and dial 25. The relatively large dial has marked near its outer edge the call letters of the stations which are most likely to provide sufficient signal strength in a given locality to require automatic amplification control, and hence an indication of exact resonance. When the dial is brought approximately to a position such that the call letters of a given desired station appear behind window 26, indicating bulb 13 begins to light up behind the translucent dial 25, its maximum brilliance on any signal corresponding to the setting of dial 25 for exact resonance with the carrier of that signal.

As a pilot to indicate whether or not the receiver is turned on, and to facilitate rapid approach to the approximate setting for a desired signal, it is within the scope of the invention to employ an auxiliary small dial, preferably located at the center of the large dial, and provided with a steadily burning light arranged to make visible a complete set of calibrations covering all of the frequencies to which receiver is tunable.

By way of illustrative example, the following constants and types are employed in one successful embodiment of the invention according to Fig. 1 of the drawing:

Vacuum tube 1 _____ Type 6K7
Vacuum tube 3 _____ Type 6Q7
Potentiometer 4 _____ 0.5 megohm
Capacitor 5 _____ 0.015 micromicrofarad
Grid-leak 6 _____ 1.0 megohm
Resistor 8 _____ 0.2 megohm
Vacuum tube 9 _____ 6F6
Capacitor 10 _____ 0.02 micromicrofarad
Resistor 11 _____ 300 ohms
Bulb 13 _____ 115-volt, 7.5-watt
Resistor 14 _____ 0.15 megohm
Resistor 15 _____ 0.5 megohm
Resistor 16 _____ 0.3 megohm
Grid-leak 17 _____ 0.25 megohm It will be understood that the invention is not limited to the use of these particular values, but that some or all of the values may be modified as required.

It is within the scope of the present invention to so arrange gang switch 19 of the embodiment of Fig. 2 that it may be operated by an axial movement of the tuning knob of the receiver or in any other convenient manner which may occur to those skilled in the art. It will be understood that the general circuit arrangement of the receiver and the particular types of the various vacuum tubes employed therein are immaterial so far as the invention is concerned and so may differ from those shown in the drawing. Likewise, forms of dial and forms of indicating device other than those shown and described may be employed in a system incorporating the principles herein disclosed without departing from the scope of the invention.

Having thus described my invention what I claim is:

1. A radio receiver including a high-frequency amplifying vacum tube having a control grid and a screen grid, a tuner for selecting any one of a number of carriers differing in frequency, a demodulator having a load resistor, a resistance network connected to said screen grid, a connection from said load resistor to said control grid for automatically regulating the gain of said high-frequency amplifier in accordance with the intensity of the selected carrier, an audio-frequency amplifier having a plate circuit and a control electrode, a connection from a point in said resistance network to said control electrode, and a current-responsive device in said plate circuit, said resistance network being so proportioned and so connected that the direct current in said plate circuit is a minimum when no carrier is being received and reaches a maximum when said tuner is accurately adjusted to select a desired carrier.

2. A radio receiver including a selector-amplifier for selecting and amplifying any one of a number of carriers differing in frequency, an automatic gain control for regulating the amplification of said selector-amplifier in accordance with the intensity of the selected carrier, a demodulator connected to the output of said selector amplifier and having a second anode, an audio-frequency amplifier having a grid and a plate circuit, two resistors having a junction, a connection from said junction to said grid, a connection from said junction to said second anode, a current-responsive device in said plate circuit, and means for maintaining the direct-current potential of said junction negative with respect to ground when no carrier is being received and for causing said junction to become less negative as said selector-amplifier is adjusted to receive a carrier, so that the direct current in said plate circuit reaches a maximum value when said selector-amplifier is accurately tuned to said selected carrier, said second anode acting to prevent said junction from becoming more than very slightly positive.

3. A radio receiver according to claim 2 having a resistor in said connection from said junction to said second anode to retard the operation of said second anode in preventing said junction from becoming more than very slightly positive.

4. A radio receiver including a tuner for selecting any one of a number of carriers differing in frequency, an audio-frequency amplifier having a plate circuit, means for causing the direct current in said plate circuit to reach a maximum value when said tuner is accurately adjusted to select a desired carrier, a device in said plate circuit for indicating maximum current therein, and a switch arranged to substantially prevent any alternating current from flowing in said plate circuit while said tuner is being adjusted to select a desired carrier, and to render said means inoperative after said tuner has been so adjusted.

5. A radio receiver including a high-frequency amplifying vacuum tube, manual tuning means for selecting any one of a number of carriers differing in frequency, a demodulator vacuum tube an audio-frequency amplifying vacuum tube, means including said demodulator vacuum tube for generating a direct-current voltage in accordance with the strength of the selected carrier and for applying said voltage to automatically regulate the amplification of said high-frequency amplifying vacuum tube, means including said high-frequency amplifying vacuum tube for reversing the polarity of said direct-current voltage and for applying said reversed voltage to a controlling grid of said audio-frequency amplifying vacum tube to cause its average plate current to be a maximum when said tuning means is accurately adjusted to receive a selected carrier, and an incandescent lamp in the plate circuit of said audio-frequency amplifying vacum tube for visually indicating said condition of accurate adjustment.

DWIGHT V. SINNINGER.